US 8,565,071 B2

(12) United States Patent
He et al.

(10) Patent No.: US 8,565,071 B2
(45) Date of Patent: Oct. 22, 2013

(54) PROTECTION METHOD, SYSTEM, AND DEVICE IN PACKET TRANSPORT NETWORK

(75) Inventors: Jia He, Shenzhen (CN); Yang Yang, Shenzhen (CN); Yongjun Zhang, Beijing (CN); Wenjun Xie, Beijing (CN); Shanguo Huang, Beijing (CN); Wanyi Gu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 473 days.

(21) Appl. No.: 12/826,298

(22) Filed: Jun. 29, 2010

(65) Prior Publication Data

US 2010/0278040 A1 Nov. 4, 2010

Related U.S. Application Data

(63) Continuation of application No. PCT/CN2008/073800, filed on Dec. 27, 2008.

(30) Foreign Application Priority Data

Dec. 29, 2007 (CN) .......................... 2007 1 0033044

(51) Int. Cl.
*G01R 31/08* (2006.01)
(52) U.S. Cl.
USPC .......................................... 370/222; 370/403
(58) Field of Classification Search
USPC .................................................. 370/222, 403
See application file for complete search history.

(56) References Cited

U.S. PATENT DOCUMENTS

2005/0207337 A1  9/2005 Oda et al.
2006/0069793 A1*  3/2006 Li et al. ........................ 709/231
(Continued)

FOREIGN PATENT DOCUMENTS

CN  1547362 A  11/2004
CN  1138788 A  12/2006
(Continued)

OTHER PUBLICATIONS

KVALBEtN A et al: "Analysis and improved performance of RPR protection" Networks, 2004. (ICON 2004). Proceedings. 12TH IEEE International Conf Erence on Singapore Nov. 16-19, 2004, Piscataway, NJ, USA,IEEE, US LNKD- DOI: 10.1109/ICON.2004. 1409103, Nov. 16, 2004, pp. 119-124, XP010777517 ISBN: 978-0-7803-8783-6.*

(Continued)

*Primary Examiner* — Anh-Vu Ly
*Assistant Examiner* — Hashim Bhatti
(74) *Attorney, Agent, or Firm* — Brinks Hofer Gilson & Lione

(57) ABSTRACT

A protection method in a packet transport network is provided. A protection path is established for a service data flow borne on a shared protection ring in the method, where the protection path includes a wrapping protection path and a steering protection path. Firstly, a first service data flow is sent through the wrapping protection path. Then, a service data flow node stops sending a second service data flow subsequent to the first service data flow to the wrapping protection path, and buffers the second service data flow. When the first service data flow completely passes by the service data flow node again, the buffered second service data flow is switched from the wrapping protection path to the steering protection path.

7 Claims, 8 Drawing Sheets

(56) References Cited

U.S. PATENT DOCUMENTS

2008/0304407 A1  12/2008  Umansky et al.
2009/0040922 A1  2/2009  Umansky et al.

FOREIGN PATENT DOCUMENTS

| CN | 1992652 A | 7/2007 |
|---|---|---|
| CN | 101309230 A | 11/2008 |
| CN | 101471849 B | 4/2011 |
| EP | 1 768 318 A1 | 3/2007 |
| EP | 1 796 328 A1 | 6/2007 |
| WO | WO 2004054183 A1 | 6/2004 |
| WO | 2005/109013 | 11/2005 |
| WO | 2006/030435 | 3/2006 |

OTHER PUBLICATIONS

IEEE Std- 802.17.- 2004.*
Amund Kvalbein and Stein Gjessing- Analysis and Improved Performance of RPR Protection- 2004.*
Written Opinion of the International Searching Authority issued in corresponding PCT Patent Application No. PCT/CN2008/073800, mailed Apr. 2, 2009.
Extended European Search Report issued in corresponding European Patent Application No. 08870940.7, mailed Nov. 11, 2010.
Kvalbein et al., "Analysis and Improved Performance of RPR Protection", Simula Research Laboratory. Lysaker Norway, IEEE 2004.
Spadaro et al., "Positioning of the RPR Standard in Contemporary Operator Environments", Universitat Politècnica de Catalunya (UPC) and AGH University of Science and Technology. IEEE Network, Mar./Apr. 2004.
International Search Report issued in corresponding PCT Application No. PCT/CN2008/073800; mailed Apr. 2, 2009.
Anelli, Pascal et al. "Evaluation of the APS Protocol for SDH Rings Reconfiguration" IEE Transactions on Communication, vol. 47 No. 9. Sep. 1999:1386-1393.
Sharma, V., et al; "Framework for Multi-Protocol Label Switching (MPLS)-based Recovery" Internet Society. Feb. 2003.
Liu, Xin et al. "A New Wrap Protection Mechanism Based on Local Buffers for Resilient Packet Ring" Communication Technology No. 12. Dec. 2003:58-60.
Davik, Fredrik et al. "IEEE 802.17 Resilient Packet Ring Tutorial" IEEE Communications Magazine. Mar. 2004: 112-118.
Spadaro, Salvatore, et al."Positioning of RPR Standard in Contemporary Operator Environments." IEEE Network. Mar./Apr. 2004:35-40.
Kvalbein, Armund, et al. "Analysis and Improved Performance of RPR Protection." IEEE. 2004:119-124.
"A Research on Two Protection Mechanisms for RPR" China Science and Technology Information. Dec. 2005:33-34.
Pan, P. et al. "Fast Reroute Extensions to RSVP-TE for LSP Tunnels" The Internet Society. May 2005.
"Characteristics of Transport MPLS Equipment Functional Blocks" ITU-T Telecommunication Standardization. Mar. 2006.
"Linear Protection Switching for Transport MPLS (T-MPLS Networks)" ITU-T Telecommunication Standardization. Feb. 2007.
"Draft New Recommendations Y.17tom [candidate No. Y.1373/G. 8114], Operation & Maintenance Mechanism for T-MPLS Layer Network" Telecommunication Standardization Sector. Apr. 2007.
Draft Recommendation G.8132, T-MPLS Shared Protection Ring (Tm-SPRing) (for consent). Jun. 2007.
Shao-wei et al., "Study on Message Drop and Disorder in MPLS Fault Restoration" Computer Engineering and Design, vol. 28, No. 1, Jan. 2007.
Part 17: Resilient Packet Ring (RPR) Access Method and Physical Layer Specifications Information Technology—Telecommunications and Information Exchange Between Systems—Local and Metropolitan Area Networks—Specific Requirements, IEEE 2004.

* cited by examiner

| | 8 7 6 5 4 3 2 1 | 8 7 6 5 4 3 2 1 | 8 7 6 5 4 3 2 1 | 8 7 6 5 4 3 2 1 |
|---|---|---|---|---|
| 1 | Function type (0x27) | Tag header field | | |
| 5 | Reserved bytes | Version number | Transport interval identifier | EXP S |
| | | | TTL | TLV offset |
| 9 | APS information | | | |
| ... | | | | |
| Last | TLV terminating identifier (0x00) | | | |

FIG. 2

| 1 | 2 | 3 | 4 | |
|---|---|---|---|---|
| 8 7 6 5 4 3 2 1 | 8 7 6 5 4 3 2 1 | 8 7 6 5 4 3 2 1 | 8 7 6 5 4 3 2 1 | |
| Target node ID | Source node ID | Bridge request/ status information | 0/1 | Reserved bytes |

FIG. 3

PROTECTION METHOD, SYSTEM, AND DEVICE IN PACKET TRANSPORT NETWORK

CROSS-REFERENCE TO RELATED APPLICATIONS

This application is a continuation of International Application No. PCT/CN2008/073800, filed on Dec. 27, 2008, which claims priority to Chinese Patent Application No. 200710033044.4, filed on Dec. 29, 2007, both of which are hereby incorporated by reference in their entireties.

FIELD OF THE TECHNOLOGY

The present disclosure relates to the field of communications technologies, and more particularly to a protection method using a shared protection ring in a packet transport network, a node device in a packet transport network, and a system in a packet transport network.

BACKGROUND

In order to improve the transport efficiency and reliability, a transport network usually adopts a ring network. Taking a T-MPLS shared protection ring (TM-SPRing) as an example, a logic adjacency relation is established between each two nodes of the ring network, and the establishing of the connection relation between corresponding nodes is not limited by physical devices and a media access control (MAC) topology. The connection between the neighboring nodes is called a span, and the span is a bi-directional connection (possibly being a physical link or a logic connection). A transporting channel entity configured to transport service data flows between nodes on the ring is implemented by a group of LSPs based on the T-MPLS. The TM-SPRing adopts a double-ring structure, and flowing directions of the service data flows of the two rings are opposite, the two rings include a working ring (working direction) and a protection ring (reverse direction of the working direction), each ring may establish a plurality of LSPs according to the amount demand of services, so as to assign different LSPs to different service data flows. The protection of the TM-SPRing is performed for the span between the neighboring nodes, and is implemented through an OAM function of the span.

When the span has a failure, in order to prevent the span between the neighboring nodes from failing, an entire protection mechanism needs to be confirmed, so as to quickly protect the span failure, and correctly and effectively transport the service data flow. Currently, the common protection mechanism using the shared protection ring has two switching mechanisms, namely, a steering manner and a wrapping manner. The largest difference between the steering manner and the wrapping manner is that after the span failure occurs, the nodes initiating the switching of the service data flow are different, where in the steering manner, the node initiating the switching of the service data flow is a source node of the service data flow, but in the wrapping manner, the node initiating the switching of the service data flow is a failed span neighboring node. The wrapping manner has a short switching starting time, and has low corresponding packet loss, but a switched wrapping protection path is not an optimal routing. A steering protection path of the steering manner is the optimal routing, but the steering manner has a long switching starting time and high corresponding packet loss.

An existing resilient packet ring (RPR) network adopts a combination protection solution of the wrapping manner and the steering manner, and the implementation of the solution is performed according to the following steps.

Firstly, after the failure occurs, a failed span neighboring node detects the failure, and immediately performs the switching operation in the wrapping manner, so that a first service data flow steer clear of the failed span, that is, the affected first service data flow (the service data flow that is about to pass by the failed span from the working direction) is wrapped to the other ring for being transported, and meanwhile, the failed span neighboring node bi-directionally sends a protection request message including the failed span information.

Next, when receiving the protection request message, the source node and the target node of the service data flow perform the switching operation in the steering manner, so that a second service data flow subsequent to the first service data flow is transferred to the other ring for being transported, so as to steer clear of the failed span.

A starting time of the switching action of the solution is equal to a starting time of the switching action in the wrapping manner, and the reason is that the wrapping protection solution is used in a first stage, so that the packet loss of the first service data flow is low. In addition, after the switching action in the steering manner is adopted, the final path which the second service data flow passes by is the same as the steering protection path in the steering manner, and is the optimal routing on the other ring, thereby improving the utilization of network resources, avoiding from introducing unnecessary time delay, and integrating advantages of the two solutions being the wrapping manner and the steering manner.

The inventors find the following problems during the implementation of the disclosure.

According to the description of the above two steps, the path of the service data flow is changed twice in the solution. For the first time, the first service data flow is switched from the working path to the wrapping protection path for being transported, and for the second time, the second service data flow is switched from the wrapping protection path to the steering protection path for being transported. As compared with the steering protection path, the wrapping protection path has the path wrapping on the working ring, so it is possible that the second service data flow sent after the second time of switching reaches the target node earlier than the first service data flow sent after the first time of switching, so as to result in a disordering problem of the service data flow.

The packet transport technique aims to implement a multi-service uniform bearing platform, and needs to transport a TDM service, and the TDM service has strict demands on a time sequence.

SUMMARY

The present disclosure is directed to a protection method in a packet transport network, a node device in a packet transport network, and a system in a packet transport network, which are capable of solving a disordering problem that occurs when a combination protection solution of a wrapping manner and a steering manner is applied in the packet transport network.

In order to solve the technical problem, in an embodiment, the present disclosure provides a protection method in a packet transport network, where a protection path is established for a service data flow borne on a shared protection ring in the packet transport network, the service data flow includes at least a first service data flow and a second service data flow, and the protection path includes a wrapping protection path and a steering protection path. The method includes the following steps.

The first service data flow is sent through the wrapping protection path.

A service data flow node stops sending the second service data flow subsequent to the first service data flow to the wrapping protection path, and buffers the second service data flow.

The first service data flow completely passes by the service data flow node again, and the buffered second service data flow is switched from the wrapping protection path to the steering protection path.

In addition, in an embodiment, the present disclosure also provides a protection method in a packet transport network, where a protection path is established for a service data flow borne on a shared protection ring in the packet transport network, the service data flow includes at least a first service data flow and a second service data flow, and the protection path includes a wrapping protection path and a steering protection path. The method includes the following steps.

A service flow source node sends the first service data flow through the wrapping protection path.

The service flow source node stops sending the second service data flow subsequent to the first service data flow to the wrapping protection path, and buffers the second service data flow.

The first service data flow completely passes by the service flow source node again, and the buffered second service data flow is switched from the wrapping protection path to the steering protection path.

The first service data flow completely passes by a service flow target node for the first time, the second service data flow is stopped from being sent to the wrapping protection path, and the second service data flow is buffered.

The first service data flow completely passes by the service flow target node again, and the buffered second service data flow is switched from the wrapping protection path to the steering protection path.

Correspondingly, in an embodiment, the present disclosure further provides a node device in a packet transport network, the node device in the packet transport network is located on a shared protection ring in the packet transport network, the shared protection ring has a protection path for bearing a service data flow, the service data flow includes at least a first service data flow and a second service data flow, and the protection path includes a wrapping protection path and a steering protection path. The node device includes a stopping unit, a buffer unit, a detecting unit, and a detection processing unit.

The stopping unit is configured to stop sending the second service data flow subsequent to the first service data flow to the wrapping protection path at the node, after sending the first service data flow to the wrapping protection path at the node.

The buffer unit is configured to buffer the second service data flow.

The detecting unit is configured to detect whether the service data flow completely passes by the node.

The detection processing unit is configured to switch the buffered second service data flow from the wrapping protection path to the steering protection path, when the detecting unit detects that the first service data flow completely passes by the node again.

In an embodiment, the present disclosure further provides a system in a packet transport network, a shared protection ring in the packet transport network is applied in the system, the shared protection ring has a protection path for bearing a service data flow, the service data flow includes at least a first service data flow and a second service data flow, and the protection path includes a wrapping protection path and a steering protection path. The system includes a service flow source node device and a service flow target node device on the shared protection ring.

The service flow source node device is configured to stop sending the second service data flow subsequent to the first service data flow to the wrapping protection path after sending the first service data flow to the wrapping protection path, and buffer the second service data flow; and switch the buffered second service data flow from the wrapping protection path to the steering protection path, when the first service data flow completely passes by the service data flow node again.

The service flow target node device is configured to detect whether the service data flow completely passes by the service flow target node; stop sending the second service data flow to the wrapping protection path, when a second detecting unit detects that the first service data flow completely passes by the service flow target node for the first time, and buffer the second service data flow; and switch the buffered second service data flow from the wrapping protection path to the steering protection path, when the second detecting unit detects that the first service data flow completely passes by the service flow target node again.

In the embodiments of the present disclosure, the first service data flow is sent through the wrapping protection path, and the service data flow node stops sending the second service data flow subsequent to the first service data flow to the wrapping protection path, and buffers the second service data flow. When the first service data flow completely passes by the service data flow node again, the buffered second service data flow is switched from the wrapping protection path to the steering protection path, thereby solving the disordering problem that occurs when the combination protection solution of the wrapping manner and the steering manner is applied in the packet transport network, so as to improve a protection mechanism of the system in the packet transport network, and enhance the capability of defending failure of the system.

BRIEF DESCRIPTION OF THE DRAWINGS

To illustrate the embodiments of the present disclosure or the prior art more clearly, the accompanying figures for describing the embodiments or the prior art are introduced briefly in the following. Apparently, the accompanying drawings in the following description are only some embodiments of the present disclosure; persons of ordinary skill in the art can obtain other drawings according to the accompanying drawings without paying any creative efforts.

FIG. 2 is a schematic view of a frame format of automatic protection switching (APS) information;

FIG. 3 is a schematic view of a content domain of a protection request in APS information;

DETAILED DESCRIPTION OF THE EMBODIMENTS

The present disclosure provides a protection method in a packet transport network, a node device in a packet transport network, and a system in a packet transport network, which are capable of solving a disordering problem that occurs when a combination protection solution of a wrapping manner and a steering manner is applied in the packet transport network.

In the following, the method, the device, and the system according to the embodiments of the present disclosure are described in detail with reference to the accompanying drawings.

Figure 1:
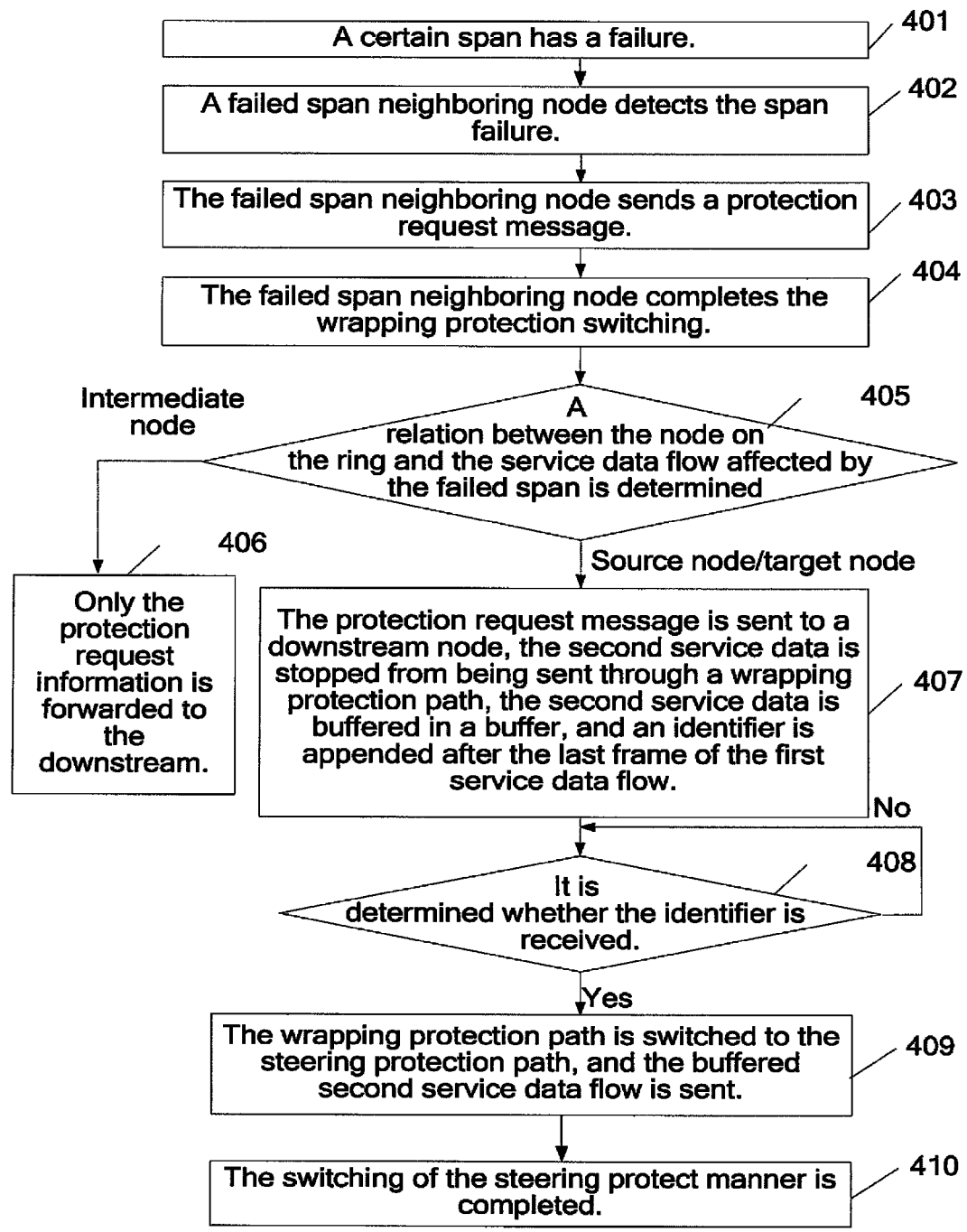
FIG. 1 is a schematic flow chart of a protection method in a packet transport network according to an embodiment of the present disclosure.

FIG. 1 is a schematic flow chart of a protection method in a packet transport network according to an embodiment of the present disclosure. In the method, taking a TM-SPRing as an example, a switching from a wrapping manner to a steering manner is completed. Moreover, the present disclosure may be applied to, but not limited to, a provider backbone bridging traffic engineering (PBB-TE) ring network, and other systems in the packet transport network. Referring to FIG. 1, the method mainly includes the following steps.

In step 401, a certain span in the TM-SPRing has a failure, and the protection of the TM-SPRing is performed for the span failure between neighboring nodes.

In step 402, a failed span neighboring node detects the span failure, and each node on the TM-SPRing monitors information on the ring network and finds the failed span in the ring network in time. The span failure is divided into two types, one is span signal false (SF), under the SF situation, the service data flow cannot be transported in the failed span, the failed span neighboring node on a downstream of a working direction cannot receive the service data flow, and the SF may be detected by an interconnection check function of an OAM packet; and the other one is span signal degraded (SD), under the SD situation, the service data flow may be transported in the failed span, but quality of the service data flow received by the failed span neighboring node on the downstream of the working direction becomes poor, the SD may be detected by packet loss, delay, and other functions of the OAM packet, each node in the ring network determines whether the span neighboring to the node normally works or has the failure by monitoring the OAM packet flowing through the node, and when the span failure is detected, step 403 is performed.

During the practical application, the following two points need to be illustrated.

First, the span failure is divided into a single-ring failure and a double-ring failure. In the embodiment of the present disclosure, the two types of failure are processed by the related node in the same manner in term of switching operation. In the description of the embodiment of the present disclosure, the double-ring failure is taken as an example, and during the single-ring failure, the content of the present disclosure is still applicable.

Second, the service data flows transported on the shared protection ring in the packet transport network are bi-directional services, and during the double-ring failure, the service data flows in the two directions are affected. The service data flow affected by the failure in one direction is switched, and the service data flow in the other direction is also switched. In the embodiment of the present disclosure, the processing procedures in the two directions are substantially consistent. For ease of description, in the illustration of the embodiment of the present disclosure, how to protect the service data flow in one direction is described, and the present disclosure is still applicable to the processing procedure in the other direction.

In step 403, the failed span neighboring node sends a protection request message (possibly in a bi-directional manner). The protection request message is in a form of APS information, so as to notify each node in the TM-SPRing of failed span information, and communicate with another failed span neighboring node, thus completing switching in the wrapping manner. A frame format of the APS information is as shown in FIG. 2, and the APS information includes a tag header field, a function type field, and an APS PDU. A content domain of the protection request includes a source node ID configured to identify and indicate a source node, a target node ID configured to identify and indicate a target node, bridge request/status information, and reserved bytes. In the embodiment of the present disclosure, the identifying function in the present disclosure may be completed by utilizing an expansion function of an $8^{th}$ bit of the reserved bytes of the APS information, as shown in FIG. 3, the bit is set as 1 (the value of the bit of the APS information before the function expansion is 0), so that the APS information has the function of indicating to stop sending the service data flow.

In step 404, the failed span neighboring node completes the wrapping protection switching, specifically, through switching the currently borne first service data flow from a working LSP to a protection LSP. The TM-SPRing inherits a data transporting method of an MPLS, each service path corresponds to one LSP, and a tag is assigned to each span on the LSP, so as to correctly transport the service data flow. The TM-SPRing completes the switching by operating the tags of the switched service data flow, each node in the TM-SPRing stores, in a database, the tags of the working LSP and the protection LSP of each service data flow on the node, and the tag of the working LSP and the tag of the protection LSP of each service data flow on each node are corresponding, thereby correctly switching the service data flow.

Each node on the TM-SPRing is adjacent to two spans, and by taking a flowing direction of a path of the service data flow as a reference, a tag of the span between the node and the neighboring node on the upstream of the flowing direction of the service data flow is called an upstream tag of the node, and a tag of the span between the node and the neighboring node on the downstream of the flowing direction of the service data flow is called a downstream tag of the node.

A bridging operation may be performed between the neighboring nodes of the failure, and during the bridging, the tags of the service data flow need to be operated, and the operation specifically includes the following steps.

For the failed span neighboring node on the upstream of the working direction, the tag of the upstream neighboring span of the working LSP on the node is replaced by the tag of the downstream neighboring span of the protection LSP on the node, and the service data flow is forwarded by using the tag of the downstream neighboring span of the protection LSP on the node, so that the borne service data flow is switched from the working LSP to the protection LSP for being transported.

For the failed span neighboring node on the downstream of the working direction, the tag of the upstream neighboring span of the protection LSP on the node is replaced by the tag of the downstream neighboring span of the working LSP on the node, and the service data flow is forwarded by using the tag of the downstream neighboring span of the working LSP on the node.

The tag is assigned and replaced by using a Mirror manner, so the tags of the superposition part of the working LSP and the protection LSP may use the same value, and when the tag of the failure neighboring node is replaced, the value of the tag is not changed. During the specific implementation, operation steps of assigning the tag in the Mirror manner are described in the following.

In step A1, the operation is based on a certain direction of a path of the bi-directional service data flow, for example, a clockwise working direction, and according to a shortest path algorithm, a shortest working path is found for the source node and the target node of the service data flow on the TM-SPRing single-ring in the clockwise direction, and the shortest working path serves as the working LSP (adopting the working direction).

In step A2, a shortest protection path is found on the entire anticlockwise TM-SPRing single-ring, and the shortest protection path serves as the protection LSP (adopting a reverse direction of the working direction, that is, the protection direction) of the working LSP.

In step A3, the tag is assigned to each span on the working LSP and the protection LSP. In order to simplify the operation, the working tag and the protection tag of the service data flow on the superposition span of the working LSP and the protection LSP may adopt the same value. In the embodiment of the present disclosure, the tag of each span corresponding to the wrapping protection path and the steering protection path respectively adopted by the wrapping manner and the steering manner is usually correspondingly the same. Of course, during the specific implementation, different tags may be assigned. In addition, the tag may be manually assigned, or may be dynamically assigned by the system.

In addition, in the embodiment of the present disclosure, the tag assigning and replacing manner in the packet transport network may be one of a Mirror manner, an unique assigning manner, a Tunnel manner, a common tag assigning manner, and other tag assigning manners in the prior art.

Figure 4:
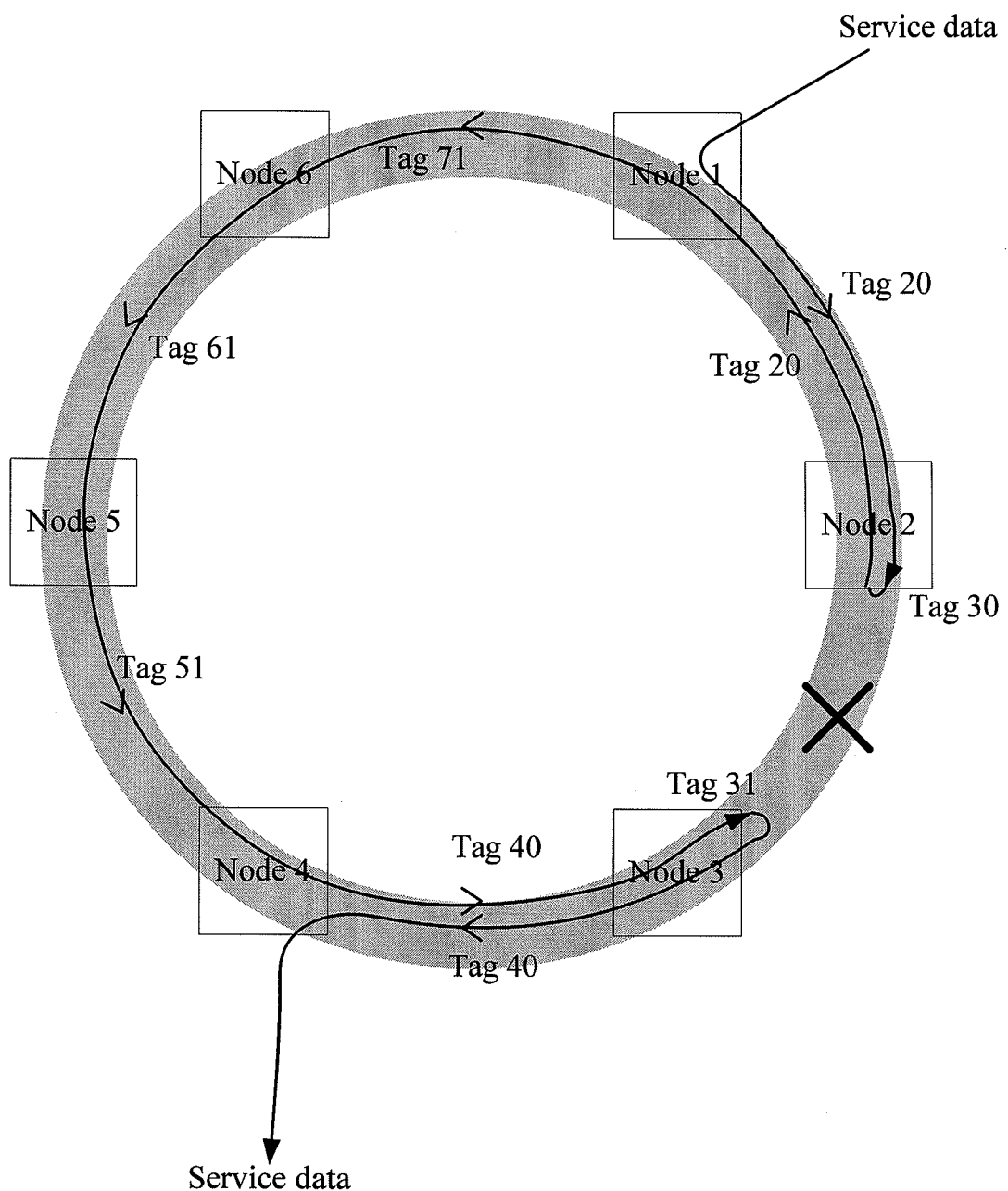
FIG. 4 is a schematic view of a wrapping switching operation in step 404 according to an embodiment of the present disclosure.

Referring to FIG. 4, in step 404, for example, the service data flow from a Node1 (source node) to a Node4 (target node) has the failure between a Node2 and a Node3, the Node2 replaces a working direction tag 20 by a protection LSP tag 20, and forwards the service data flow by using the protection LSP tag 20, so as to switch the service data flow to the protection LSP for being transported; and the Node3 replaces a protection direction tag 40 by a working LSP tag 40, and switches the service data flow to the working LSP for being transported.

In step 405, after receiving protection request information, each of the other nodes on the ring except for the neighboring nodes of the failure extracts source node ID information and target node ID information in the protection request information, acquires position information of the failed span, and determines a relation between the node on the ring and the service data flow affected by the failed span. If the node is an intermediate node (neither the source node nor the target node) of the service data flow affected by the failed span, the procedure proceeds to step 406.

If the node is the source node/target node of the service data flow affected by the failed span, the procedure proceeds to step 407.

A plurality of service data flows may pass by one span, and usually a plurality of service data flows may be affected by the failed span. For example, the node on the TM-SPRing may have different relations with different service data flows affected by the failed span, the node on the TM-SPRing may be the intermediate node of the service data flow 1 affected by the failed span, and may also be the source node of the service data flow 2 affected by the failed span. During the specific implementation, the protection operation is implemented based on one path of the service data flow, and during the process of protecting the service data flow, the relation between each node on the ring and the service data flow is confirmed.

In step 406, if the current node is neither the failed span neighboring node nor the source node or the target node of the service data flow affected by the failed span, only the protection request information is forwarded to the downstream node.

If it is determined that the node is not the failed span neighboring node according to the failed span information, even it is detected that the quality of the service data flow received by the node is poor or the service data flow cannot be received, the node does not generate the protection request information, thereby avoiding from repeatedly generating the protection request information.

In step 407, if the node is the source node/target node of the service data flow affected by the failed span, the source node/target node performs the following operations.

The source node/target node sends a first service data flow through a wrapping protection path, here the TM-SPRing has a protection path established for protecting the service data flow, and the protection path includes a wrapping protection path and a steering protection path.

After receiving the protection request message, the source node/target node sends the protection request message to a downstream node.

After receiving the protection request message, the source node/target node stops sending a second service data flow (possibly being a ring-in data flow) subsequent to the first service data flow through the wrapping protection path, and buffers the second service data flow in a buffer. Specifically, the second service data flow may be buffered in a source node/target node reverse buffer, where the second service data flow serves as the service data flow subsequent to the first service data flow sent to the wrapping protection path before a stopping moment of the source node. Two dynamic unidirectional Buffers, including a forward Buffer and a reverse Buffer, are set for all the nodes on the ring by the TM-SPRing, where the working direction is called the forward direction, and the protection direction (reverse direction of the working LSP) is called the reverse direction, and the dynamic Buffer refers to that a counter is set on an inlet of the Buffer, so that a practical length of the service data flow is returned during the switching process, so as to adjust the pointer, thereby implementing the dynamically assigning of the Buffer.

In the source node/target node device, the function of receiving the protection request message may be implemented by a receiving unit.

In the source node/target node device, the function of stopping sending the second service data flow through the wrapping protection path may be implemented by a stopping unit. After the receiving unit receives the protection request message, the stopping unit stops sending the second service data flow through the wrapping protection path.

In the source node/target node device, the second service data flow is buffered in the buffer, and the buffer is a buffer unit executing the buffer function in the source node/target node device.

The source node/target node appends an identifier to the last frame of the first service data flow, specifically, expands the function of the received protection request message (APS information), modifies the value of the $8^{th}$ bit in the reserved bytes in the APS information to 1 (the original value is 0), and appends the expanded APS information as the identifier to the last frame of the first service data flow sent through the wrapping protection path.

In the source node/target node device, the function of appending the identifier to the last frame of the first service data flow is completed by an identifier appending unit in a detecting unit in the source node/target node device.

It should be noted that the APS information having the function of indicating to stop sending the second service data flow and the APS information (protection request message) including the failure information and initially received by the source node/target node are different only in values of the $8^{th}$ bits in the reserved bytes, and other position data is the same. After receiving the unexpanded APS information including the failure information, the source node expands the function of the APS information to be the identifier through a function expansion operation, and the source node/target node continues to send the unexpanded APS information to the node of the downstream direction.

In addition, in the embodiment of the present disclosure, the APS information function is expanded, the function of indicating to stop sending the service data flow is added to the APS information, but the inherent functions are not changed, and other operations related to the APS information are not changed. It should be noted that the indication function is an expansion of the OAM function, which is not limited to use the APS information, other OAM functions may be used, or other message packet is expanded.

In step 408, the source node/target node monitors the information on the TM-SPRing, and determines whether the identifier is received. The first service data flow transported through the wrapping protection path may pass by the source node/target node again, so that the source node/target node necessarily receives the identifier sent by the source node before. When the identifier is received, the procedure proceeds to step 409, and otherwise, step 408 is repeated.

In the source node/target node device, the function of determining whether the identifier is received may be completed by a determining unit in the detecting unit in the source node/target node device.

In step 409, the source node/target node terminates the identifier, switches the wrapping protection path to the steering protection path, and sends the buffered second service data flow. Specifically, the source node/target node switches the buffered second service data flow from the wrapping protection path to the steering protection path, and sends the buffered second service data flow in a reverse direction through the reverse Buffer. Here, the source node/target node transports the buffered second service data flow along the steering protection path. During the switching procedure, the tag of the downstream neighboring span of the working LSP on the source node/target node needs to be replaced by the tag of the downstream neighboring span of the protection LSP on the source node/target node, and the second service data flow is forwarded by using the span tag on the protection LSP.

In the source node/target node device, the function of switching the wrapping protection path to the steering protection path and sending the buffered second service data flow is implemented by a detection processing unit of the source node/target node device.

By implementing step 407, step 408, and step 409 together, it is ensured that when the source node/target node processes the switching, the earlier-sent service data flow reaches early, and the disordering problem of the service data flow does not occur.

Figure 5:
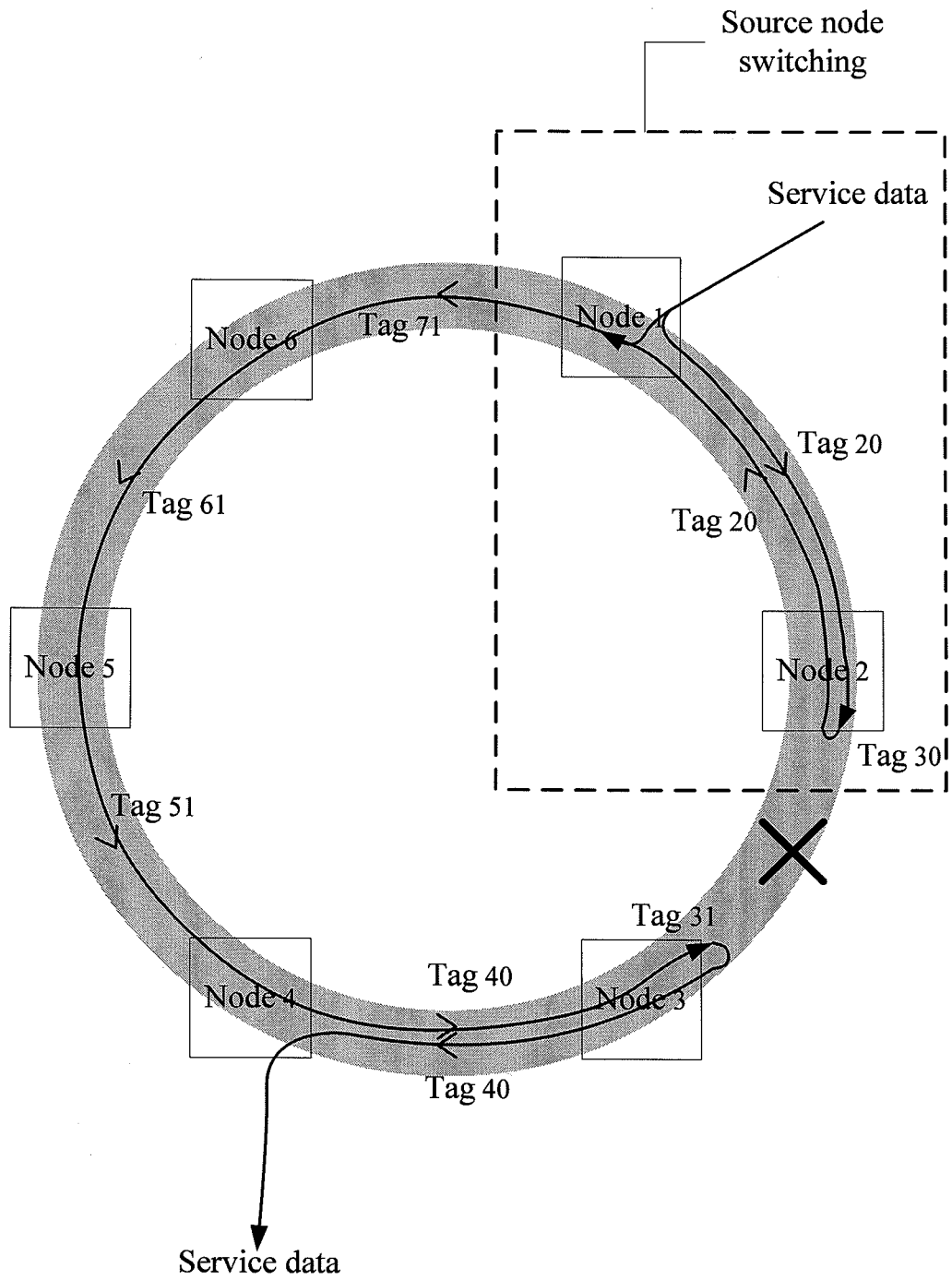
FIG. 5 is a schematic view of an operation in which a source node is switched to a steering protection path in step 409 according to an embodiment of the present disclosure.

As shown in FIG. 5, for example, the span between the Node2 and the Node3 has the failure, and the switching process of the source node and the transporting path of the service data flow in the embodiment of the present disclosure are thus described.

In B1, for the transporting path of the first service data flow on the wrapping protection path:

The first service data flow is sent from the source node Node1 and reaches the target node Node4 through a path of
Node1→Node2→Node1→Node6→Node5→Node4→Node3→Node4.

In B2, for a specific processing process:

Firstly, the Node1 receives the identifier sent by the Node3, modifies the $8^{th}$ bit in the reserved bytes in the APS information to 1, and forms the identifier having the function of indicating to stop sending the service data flow.

Next, the Node1 stops (corresponding to the stopping moment of the source node) sending the second service data flow subsequent to the first service data flow to the wrapping protection path, appends the identifier to the last frame of the first service data flow sent through the wrapping protection path, sends the first service data flow along the wrapping protection path, and at the same buffers the stopped second service data flow in the reverse Buffer.

Then, when the Node1 does not detect that the identifier is received, it indicates that the first service data flow passing by the Node1 in the protection direction on the wrapping protection path does not pass by the path of Node1→Node2→Node1, and the Node1 does not act. When the Node1 detects that the identifier is received, it indicates that the last frame of the first service data flow transported along the wrapping protection path and sent before the stopping moment has passed by the path of Node1→Node2→Node1, and reaches the downstream position of the protection LSP of the Node1. Here, the Node1 processes the switching (corresponding to the switching moment of the source node) in the steering protection manner, the tag of an outlet of the Node1 is set as 71 instead of 20, the Node1 firstly sends the first service data flow buffered in the reverse Buffer along the protection direction, and directly transports the subsequent second service data flow on the steering protection path. The target node does not perform the switching, from the stopping moment of the source node to the switching moment of the source node, and the service data flow transported on the wrapping protection path reaches the target node through the path of Node1→Node6→Node5→Node4→Node3→Node4 after the switching moment of the source node. In this manner, the earlier-sent first service data flow reaches the target node early, so as to ensure the correct time sequence relation between the first service data flow and the second service data flow.

Figure 6:
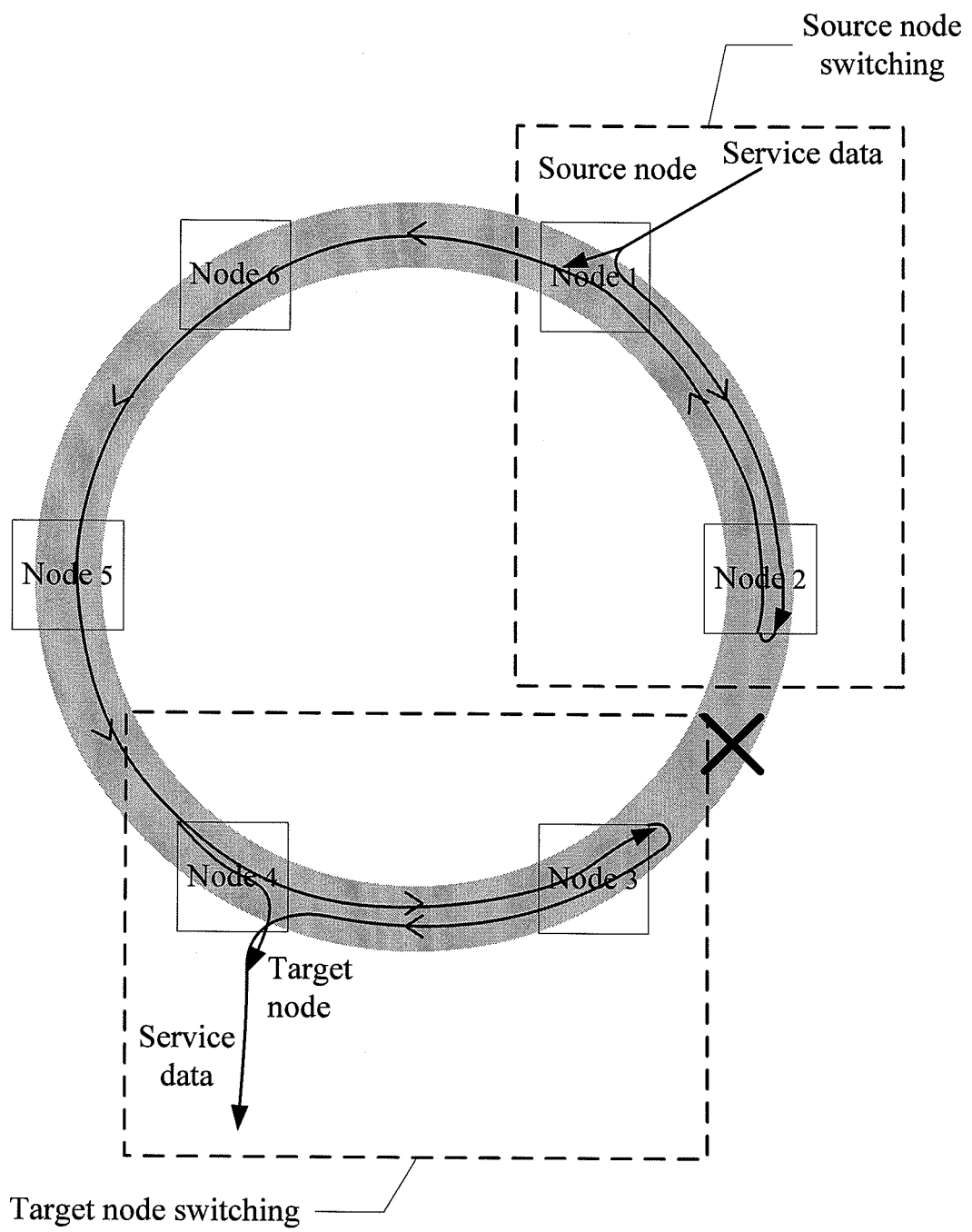
FIG. 6 is a schematic view of an operation in which a source node and a target node are switched to a steering protection path according to an embodiment of the present disclosure.

In addition, the switching process of the target node and the transporting path of the service data flow may be described with reference to the switching process of the source node and the transporting path of the service data flow, specifically, as shown in the schematic view of the operation in which the source node and the target node are switched to the steering protection path according to the embodiment of the present disclosure of FIG. 6, so as to ensure that the disordering problem of the service data flow does not occur when the target node is switched.

In step 410, both the source node and the target node complete the switching of the steering protect manner, switch the service data flow from the wrapping protection path to the steering protection path for being transported, and complete the procedure of switching from the wrapping manner to the steering manner. As shown in FIG. 6, for description, for example, the span between the Node2 and the Node3 has the failure, and after the protection switching on the target node is completed, the transport path of the subsequent service data flow from the source node to the target node is Node1→Node6→Node5→Node4.

Figure 7:
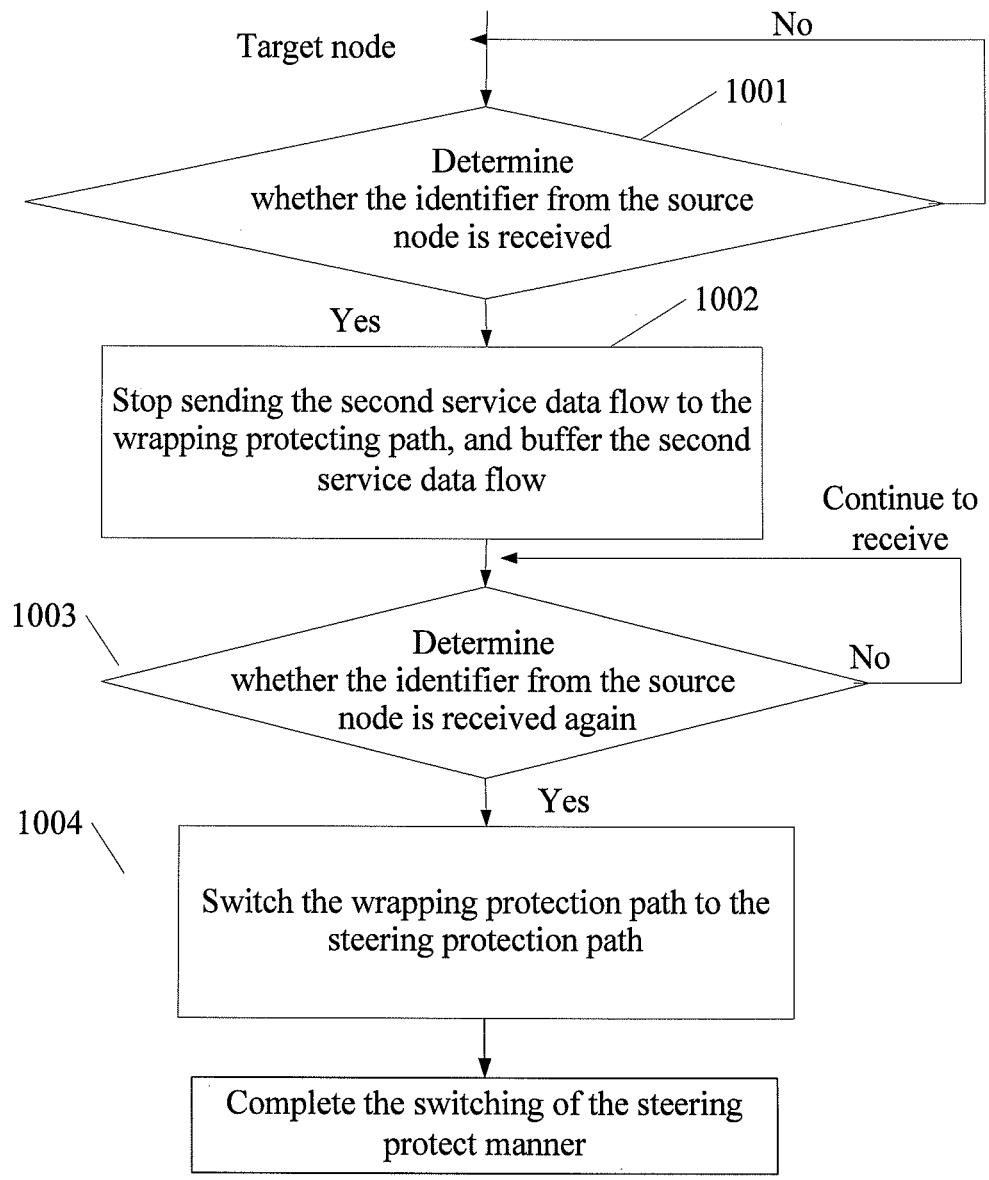
FIG. 7 is a schematic view of another protection method in a packet transport network according to an embodiment of the present disclosure.

As an implementation manner, the processing of the protection request message on the target node and the corresponding switching operation has the following manner, that is, in the process, after the processing process of the source node, the process performed on the target node may be replaced by the following steps, and the entire process is as shown in FIG. 7.

In step 1001, after receiving the protection request information, the target node monitors the information on the TM-SPRing, and determines whether the identifier from the source node is received. The target node necessarily receives the identifier sent by the source node, and when the target node receives the identifier for the first time, the procedure proceeds to step 1002; otherwise, step 1001 is repeated.

The target node receives the identifier for the first time, it indicates that the first service data flow transported through the wrapping protection path completely passes by the target node, and is transported to the target node along the wrapping protection path in the wrapping manner.

In step 1002, the target node stops sending the second service data flow to the wrapping protecting path, and buffers the second service data flow. Specifically, the target node buffers the second service data flow in the reverse Buffer, and at the same time the target node receives the first service data flow from the wrapping protection path.

In step 1003, the target node determines whether the identifier from the source node is received again, and if the identifier from the source node is received again, the procedure proceeds to step 1004; otherwise, step 1003 is repeated.

In step 1004, the target node switches the wrapping protection path to the steering protection path, switches the buffered second service data flow from the wrapping protection path to the steering protection path, then starts to receive the subsequent service data flow buffered in the reverse Buffer on the steering protection path, so as to complete the switching of the steering protection manner.

By implementing step 1001, step 1002, step 1003, and step 1004 together, it is ensured that the disordering problem of the service data flow does not occur when the target node performs the protection switching. As shown in FIG. 6, for example, the span between the Node2 and the Node3 has the failure, and after the protection switching is completed, the transport path of the subsequent service data flow from the source node to the target node is Node1→Node6→Node5→Node4.

By integrating the units having the certain functions in the method, a related device and a related system in the embodiment of the present disclosure may be acquired.

Figure 8:
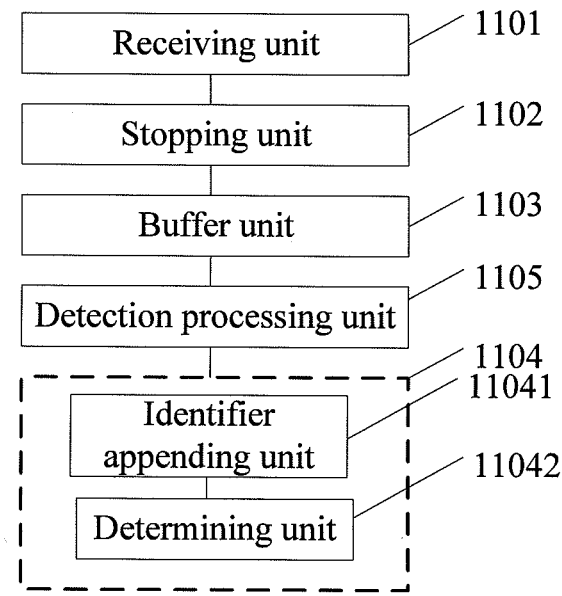
FIG. 8 is a schematic structural view of a source node device/target node device according to an embodiment of the present disclosure.

A source node device/target node device has functional units as shown in FIG. 8, and the functional units include a receiving unit 1101, a stopping unit 1102, a buffer unit 1103, a detecting unit 1104, and a detection processing unit 1105 having the above corresponding functions, where the detecting unit 1104 includes an identifier appending unit 11041 and a determining unit 11042 having the above corresponding functions. It should be noted that when the target node device determines, by using an identifier provided by the identifier appending unit of the source node device, a service data flow passing by the target node, the target node device does not need the identifier appending unit.

Figure 9:
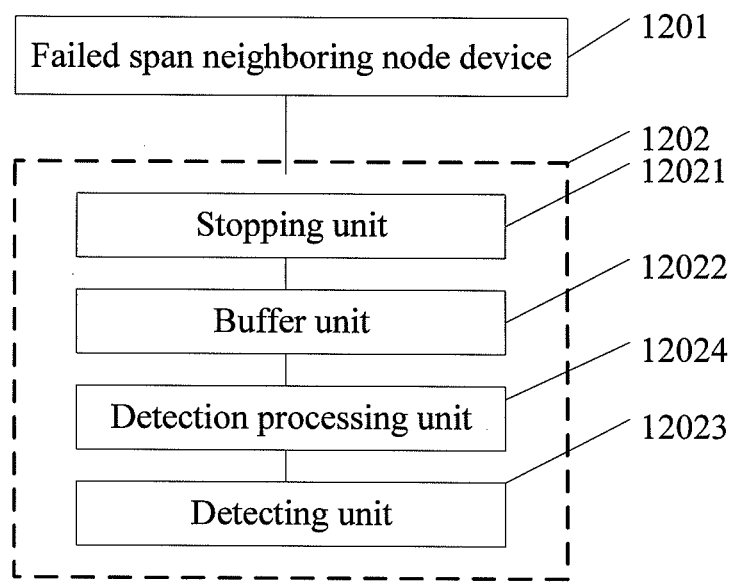
FIG. 9 is a schematic structural view of a system in a packet transport network according to an embodiment of the present disclosure.

A system in a packet transport network has devices as shown in FIG. 9, and the devices include a failed span neighboring node device 1201 and a source/target node device 1202, where the source/target node device 1202 includes a stopping unit 12021, a buffer unit 12022, a detecting unit 12023, and a detection processing unit 12024 having the above corresponding functions.

For example, the source node device/target node device may further include the receiving unit referred in the method.

In the method, the device, and the system according to the embodiment of the present disclosure, firstly, the first service data flow is sent through the wrapping protection path. Then, the service data flow node stops sending the second service data flow subsequent to the first service data flow to the wrapping protection path, and buffers the second service data flow. When the first service data flow completely passes by the service data flow node again, the buffered second service data flow is switched from the wrapping protection path to the steering protection path, thereby solving the disordering problem that occurs when the combination protection solution of the wrapping manner and the steering manner is applied in the packet transport network, so as to improve the protection mechanism of the system in the packet transport network, and enhance the capability of defending failure of the system. It should be noted that the source node of the service flow and the target node of the service flow are the service data flow nodes having the function of sending the service data flow, and other nodes having the functions described in the present disclosure are also within the protection scope of the present disclosure.

Persons of ordinary skill in the art should understand that that all of or a part of processes in the method according to the embodiments may be implemented by a computer program instructing relevant hardware. The program may be stored in a computer readable storage medium. When the program is executed, the processes of the method according to the embodiments of the present disclosure are performed. The storage medium may be a magnetic disk, an optical disk, a read-only memory (ROM) or a random access memory (RAM).

The above descriptions are merely some exemplary embodiments of the present disclosure. It should be noted by persons of ordinary skill in the art that modifications and improvements may be made without departing from the principle of the present disclosure, which should be construed as falling within the scope of the present disclosure.

What is claimed is:

1. A protection method in a packet transport network, in which a protection path is established for bearing a service data flow on a shared protection ring, wherein the service data flow comprises at least a first service data flow and a second service data flow, which is subsequent to the first service data flow, and the protection path comprises a wrapping protection path and a steering protection path, the method comprising:

sending, by a node, the first service data flow through the wrapping protection path if being informed that a span of the shared protection ring is failed;

stopping sending, by the node, the second service data flow through the wrapping protection path;

buffering, by the node, the second service data flow;

after the node stops sending the second service data flow through the wrapping protection path, determining if the first service data flow again passes by a source node or a target node and switching, by the node, the protection path from the wrapping protection path to the steering protection path if it is determined that the first service data flow passes by the source node or the target node again; and sending, by the node, the buffered second service data flow through the steering protection path.

2. The protection method in a packet transport network according to claim 1, wherein the sending the first service data flow through the wrapping protection path comprises:

appending, by the node, an identifier to the first service data flow, and sending, by the node, the first service data flow carrying the identifier.

3. The protection method in a packet transport network according to claim 2, wherein before sending the first service data flow through the wrapping protection path, the method further comprises:

receiving, by the node, a protection request message from a neighboring node of the failed span; and acquiring, by the node, position information of the failed span according to the protection request message.

4. A system in a packet transport network, wherein a shared protection ring in the packet transport network is applied in the system, the shared protection ring has a protection path for bearing a service data flow, the service data flow comprises at least a first service data flow and a second service data flow, which is subsequent to the first service data flow, the protection path comprises a wrapping protection path and a steering protection path, the system comprising a service flow source node device and a service flow target node device on the shared protection ring, wherein the service flow source node device is configured to send the first service data flow through the wrapping protection path if the service flow source node device is informed that a span of the shared protection ring is failed; stop sending the second service data flow through the wrapping protection path; buffer the second service data flow; switch the protection path from the wrapping protection path to the steering protection path if the first service data flow passes by the service flow source node again; and send the buffered second service data flow through the steering protection path; and the service flow target node device is configured to detect whether the first service data flow passes by the service flow target node; stop sending the second service data flow through the wrapping protection path and buffer the second service data flow when detecting that the first service data flow passes by the service flow target node for the first time; switch the protection path from the wrapping protection path to the steering protection path and send the buffered second service data flow through the steering protection path when detecting that the first service data flow passes by the service flow target node again.

5. The protection method in a packet transport network according to claim 1, wherein the node is one of a source node and a target node of the service data flow.

6. The protection method in a packet transport network according to claim 2, the method further comprises:

determining, by the node, that the first service data flow passes by the source node or the target node again if the identifier is received.

7. The protection method in a packet transport network according to claim 3, the protection request message is an automatic protection switching (APS) information, wherein method further comprises:

the identifier is obtained by modifying the value of the $8^{th}$ bit in a reserved bytes in the APS information to 1.

* * * * *